(12) United States Patent
Grasselli (10) Patent No.: US 8,579,684 B2
(45) Date of Patent: Nov. 12, 2013

(54) MEAT-CUTTING MACHINE, IN PARTICULAR FOR CUTTING MEAT WITH BONE

(76) Inventor: Giorgio Grasselli, Albinea (IT)

(*) Notice: Subject to any disclaimer, the term of this patent is extended or adjusted under 35 U.S.C. 154(b) by 0 days.

(21) Appl. No.: 13/450,897

(22) Filed: Apr. 19, 2012

(65) Prior Publication Data

US 2012/0270486 A1 Oct. 25, 2012

(30) Foreign Application Priority Data

Apr. 20, 2011 (IT) .......................... MI2011A000680

(51) Int. Cl.
*A22C 18/00* (2006.01)

(52) U.S. Cl.
USPC ........................................ 452/150

(58) Field of Classification Search
USPC .......................... 452/149–151, 154–157, 170
See application file for complete search history.

(56) References Cited

U.S. PATENT DOCUMENTS

| | | | | |
|---|---|---|---|---|
| 4,321,729 | A * | 3/1982 | Ollik | 452/170 |
| 5,080,631 | A * | 1/1992 | Howard et al. | 452/166 |
| 5,725,424 | A * | 3/1998 | Dufour et al. | 452/160 |
| 5,860,348 | A * | 1/1999 | Morse et al. | 83/864 |
| 6,045,071 | A | 4/2000 | Emsens | |
| 7,623,249 | B2 * | 11/2009 | Sandberg et al. | 356/601 |
| 8,033,897 | B2 * | 10/2011 | Shimachi et al. | 452/149 |
| 2010/0031791 | A1 | 2/2010 | Hallvardsson et al. | |

FOREIGN PATENT DOCUMENTS

| | | |
|---|---|---|
| WO | 0065922 | 11/2000 |
| WO | 2006123368 | 11/2006 |

* cited by examiner

*Primary Examiner* — Richard Price, Jr.
(74) *Attorney, Agent, or Firm* — Pearne & Gordon LLP (57) ABSTRACT

The invention discloses a meat-cutting machine used in particular for cutting meat with bone, including a containment channel 10 holding a piece of meat 20 to be cut, the walls 11, 12, 13, 14 of which form a guide for feeding the piece of meat 20 to an outlet opening 15. At the opening 15, cutting device 30 cuts the piece of meat 20 in a timing sequence established by a user control unit 80.

14 Claims, 10 Drawing Sheets

MEAT-CUTTING MACHINE, IN PARTICULAR FOR CUTTING MEAT WITH BONE

APPLICATION FIELD

The present invention relates to a meat-cutting machine.

In particular, the present invention relates to a meat-cutting machine for cutting meat with bone and the following specification refers to this application field.

KNOWN ART

Meat-cutting machines are known in which a piece of meat to be cut is constrained in motion by a clamp to be then pushed towards a blade.

This method has a series of drawbacks.

First, the portion of the piece of meat that is retained by the clamp cannot be cut; consequently, this portion cannot be packaged by a packaging machine downstream of the meat-cutting machine. Generally this portion is not at all used and packaged and therefore is wasted.

It is apparent that this involves higher production costs.

Secondly, the clamp does not ensure a reliable grip of the piece of meat that, accidentally, can move and therefore turn a wrong side thereof towards the cutting blade, bringing about an inaccurate cut.

Consequently, the slice can be cut with uneven thickness or the cut can be oriented in an incorrect manner relative to the meat fibres; in some cases, crushing of the bone can even occur or the blade can be blocked due to the strong resistance of the piece of meat in an incorrect position.

The present invention aims at providing a meat-cutting machine, in particular for cutting meat with bone, that overcomes or at least limits the drawbacks of the known art.

It is a particular aim of the invention to provide a meat-cutting machine, specifically for cutting meat with bone, that is more reliable in terms of quality and amount of the meat cuts.

SUMMARY OF THE INVENTION

The foregoing and further aims are achieved by a meat-cutting machine, in particular for cutting meat with bone, as described in the appended claims.

The meat-cutting machine according to the invention achieves the following main technical effects:

reliable locking of the meat in the machine;
more accurate control of the cutting features;
more reliable cut;
cut of better quality.

The above and other technical effects of the invention will be better detailed in the following specification concerning embodiments given by way of non-limiting examples with reference to the accompanying drawings.

DETAILED DESCRIPTION

According to the invention, a meat-cutting machine particularly used for cutting meat with bone comprises a containment channel for a piece of meat to be cut the walls of which create a guide for advancing or feeding of the piece of meat to an outlet opening.

At the opening, cutting means cuts the piece of meat following a timed sequence established by a control unit.

Figure 1:
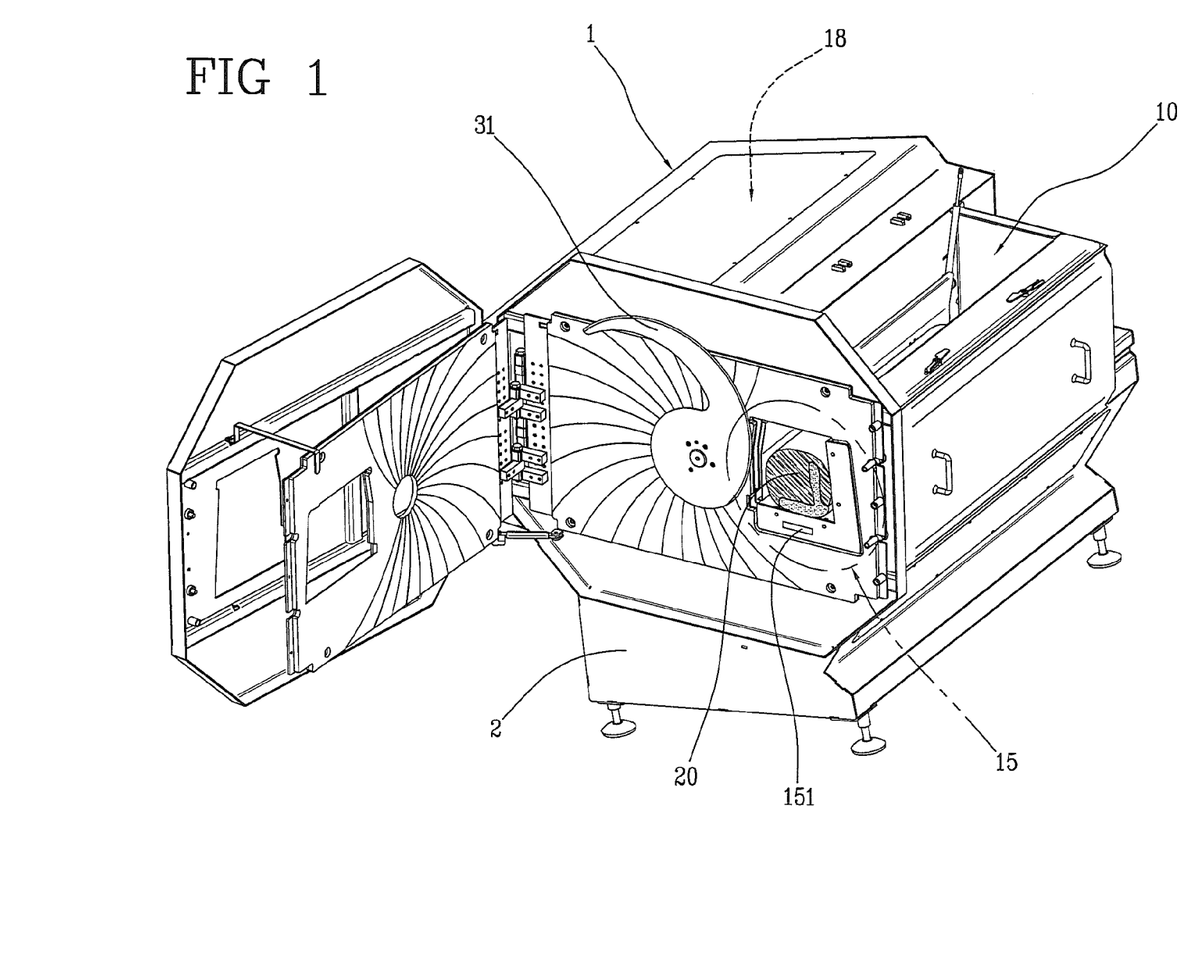
FIG. 1 is a general view of the meat-cutting machine of the invention.
Figure 2:
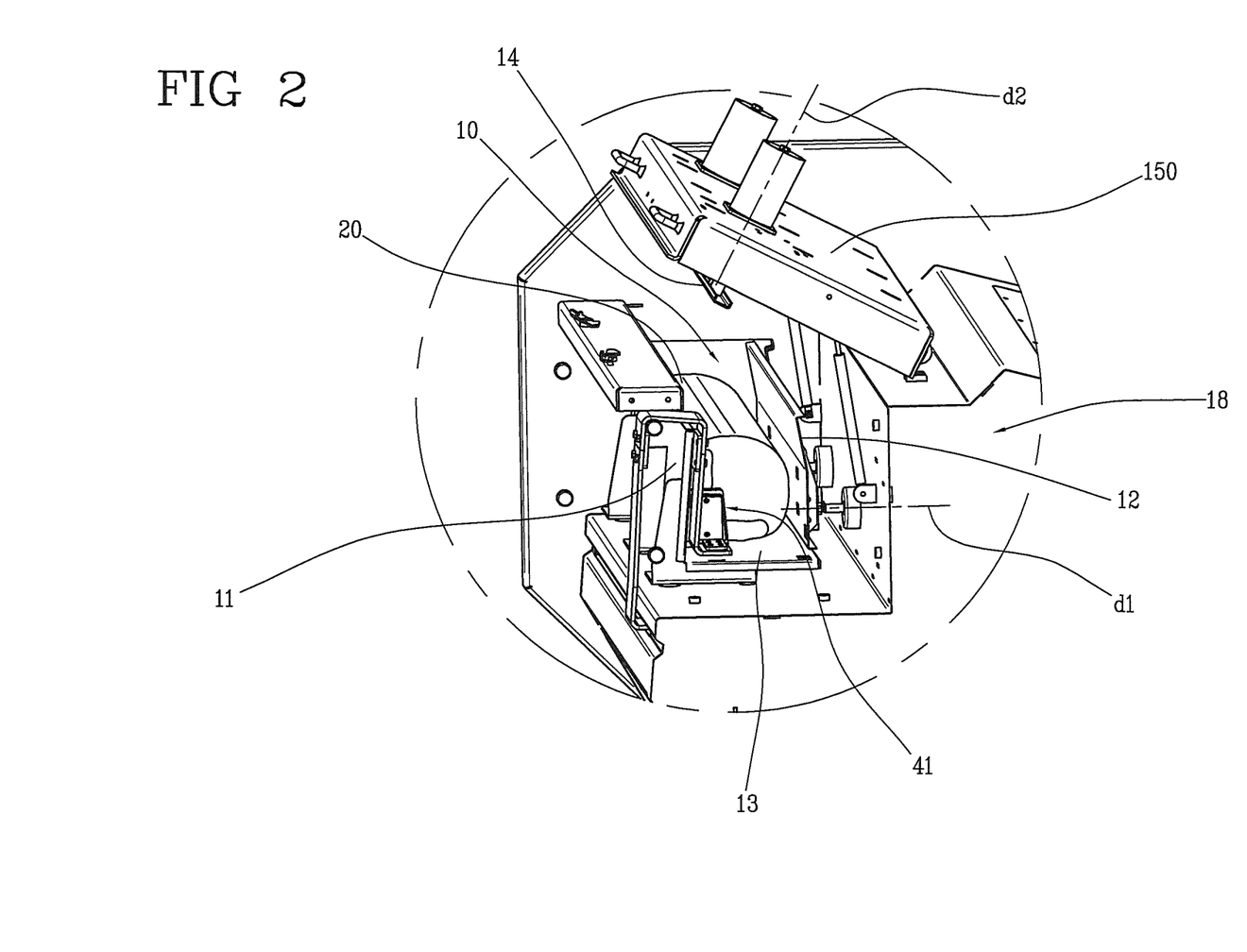
FIG. 2 is a section view of a portion of the meat-cutting machine of FIG. 1.

Referring particularly to FIGS. 1 and 2, the meat-cutting machine of the invention comprises a base 2 on which a machine structure 1 is mounted.

The meat-cutting machine in the machine structure 1 comprises a housing structure 18 for receiving mechanical/electronic components interacting in the machine.

The meat-cutting machine in the machine structure 1 comprises a channel 10 inside which a piece of meat 20 to be cut is positioned.

The piece of meat 20 is adapted to move forward in an advancing or feeding direction d in channel 10.

According to the invention. channel 10 is defined by faced walls 11, 12 and 13, 14.

According to the invention, walls 11, 12 and 13, 14 are movable relative to each other in respective directions d1, d2 transverse to the feeding direction of the piece of meat 20.

The technical effect thus achieved is a better constraint of the piece of meat in the cutting channel. Preferably, the faced walls 11, 12 and 13, 14 are opposite and can be mutually translated in respective directions d1, d2 perpendicular to the feeding direction d of the piece of meat 20.

Still with reference to FIG. 2, in a preferred embodiment of the invention, the first pair of opposite walls 11, 12 comprises a first fixed main wall 11.

The first main wall 11 is fixed because it is integral with the base 2 of the meat-cutting machine.

The first pair of opposite walls 11, 12 further comprises a first secondary wall 12, in motion relative to the first main wall 11 and adapted to push the piece of meat 20 towards the first main wall 11.

The first fixed main wall 11 and the first movable secondary wall 12 are mounted on the meat-cutting machine on opposite sides relative to channel 10 in substantially parallel planes.

Preferably, the first fixed wall 11 is mounted to the meat-cutting machine at a proximal position relative to channel 10 and a distal position relative to the housing structure 18.

Referring particularly to FIG. 2, the first movable secondary wall 12 is adapted to move in the direction d1 perpendicular to the movement direction d of the piece of meat 20; direction d1 further appears to be perpendicular to the planar extension of the first fixed wall 11.

In a preferred embodiment of the invention, the second pair of opposite walls 13, 14 comprises a second fixed main wall 13.

The second main wall 13 is fixed because it is integral with the base 2 of the meat-cutting machine 2.

The second pair of opposite walls 13, 14 further comprises a second secondary wall 14 in motion relative to the second main wall 13 and adapted to push the piece of meat 20 towards the second main wall 13.

The second fixed main wall 13 and second movable secondary wall 14 are mounted to the meat-cutting machine on opposite sides relative to channel 10 in substantially parallel planes.

Preferably, the second fixed wall 13 is mounted to a proximal position relative to base 2, while the second movable wall 14 is mounted to a distal position relative to base 2.

The second movable wall 14 is integral with a closing lid 150 of channel 10.

Lid 150 is hinged on the housing structure 18 and is adapted to carry out a rotary motion between two positions:
  a closed position at which it lies in a plane parallel to the second fixed wall 13.
  In this case, the second movable wall 14 is adapted to be moved so as to constrain the piece of meat 20 in channel 10 pushing it towards the second fixed wall 13.
  an open position at which it lies in a plane transverse to the second fixed wall 13 enabling access to channel 10.

The faced walls further form an outlet opening 15 for exit from frame 1 of the meat-cutting machine. In other words, the faced walls form an outlet opening for exit of the piece of meat 20 from channel 10.

The technical effect achieved by the presence of the faced walls that are movable relative to each other is their forming a guide for feeding the piece of meat 20 in channel 10. In this manner, feeding of the piece of meat in the feeding direction d towards the outlet opening 15 is uniform and therefore a meat cut of better quality can be obtained.

Figure 3:
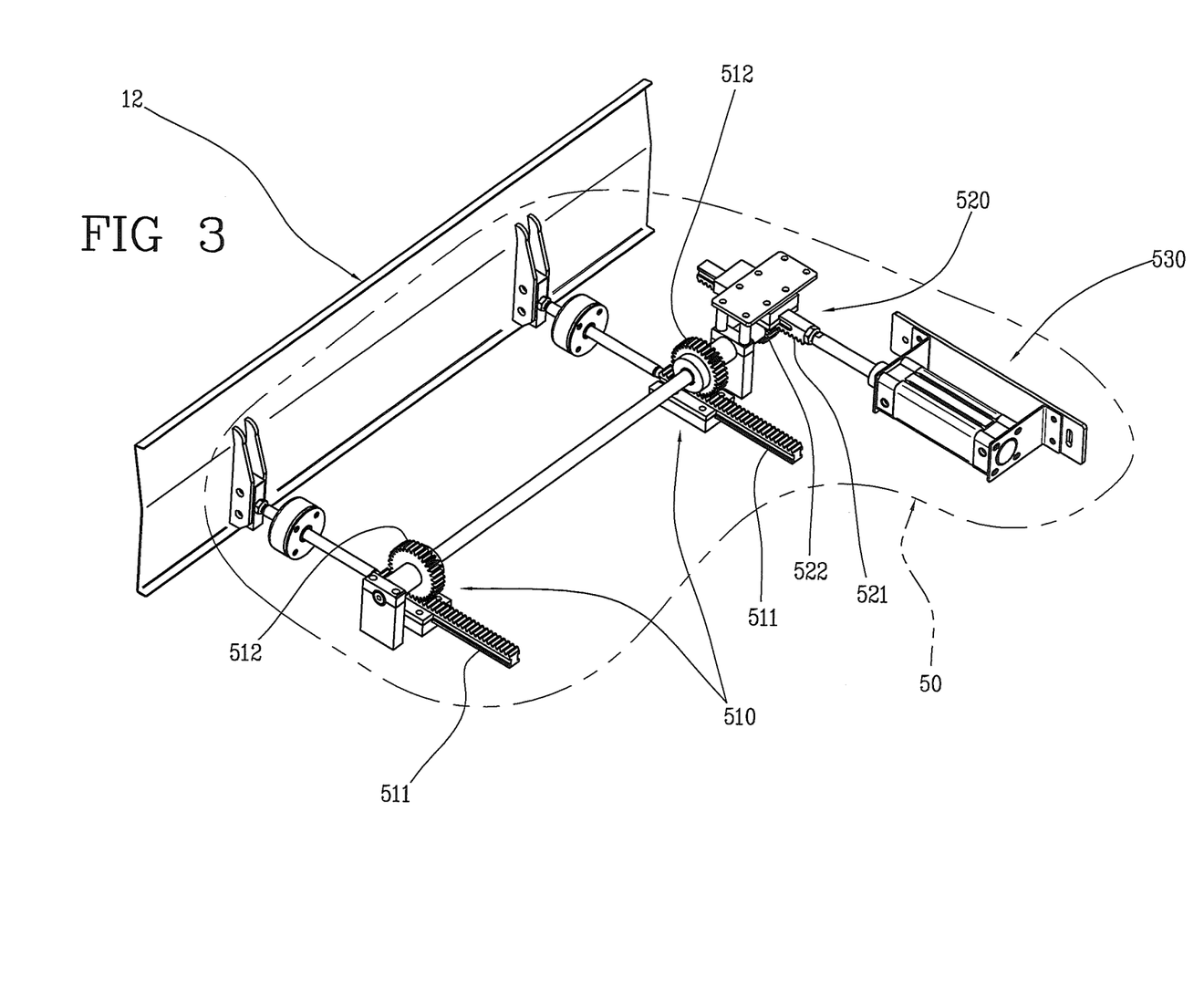
FIG. 3 is a perspective view of a first main thrust unit of the meat-cutting machine of the invention.
Figure 4:
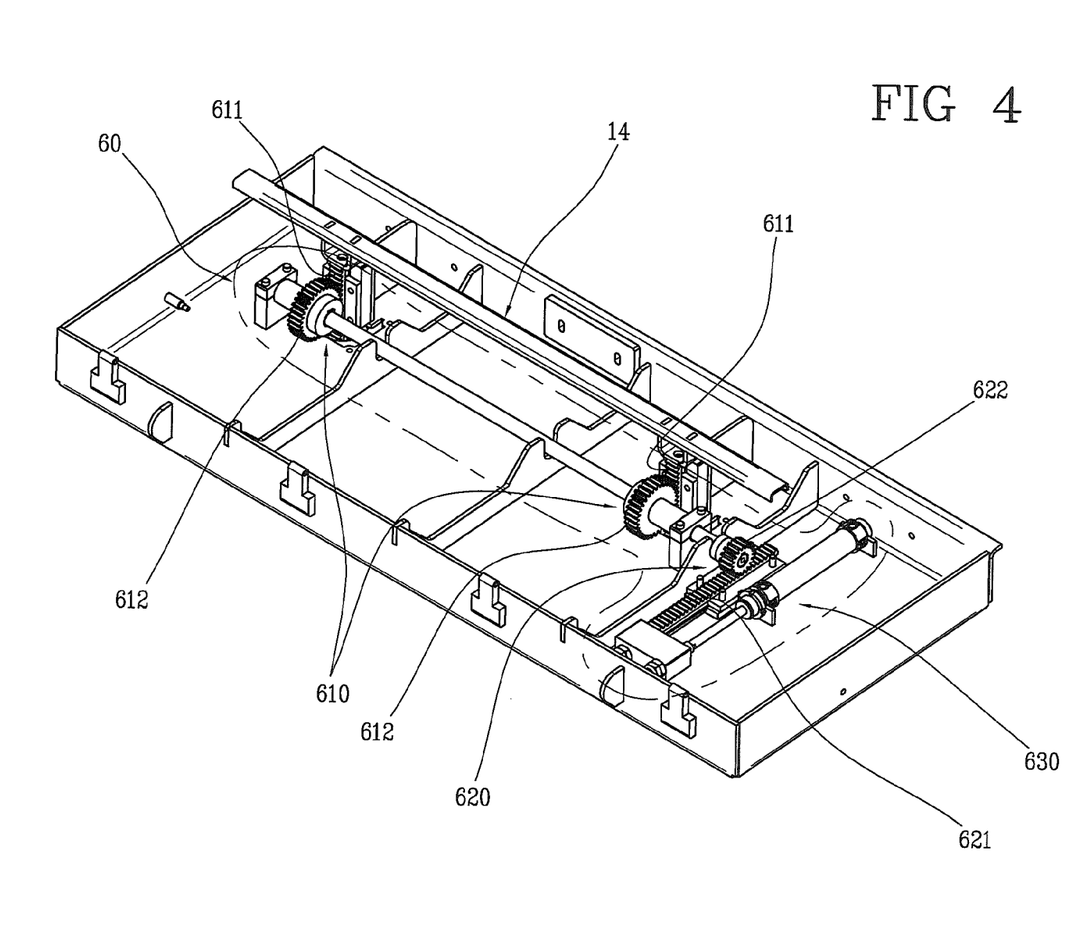
FIG. 4 is a perspective view of a second main thrust unit of the meat-cutting machine of the invention.

With particular reference to FIGS. 3 and 4, the meat-cutting machine according to the invention comprises a main thrust unit 50, 60 associated with the movable secondary wall 12, 14. In other words, the main thrust unit 50, 60 is mounted on the same side of channel 10 relative to the movable secondary wall 12, 14.

According to the invention, the main thrust unit 50, 60 is suitable to act on the secondary wall 12, 14 to determine movement thereof relative to the fixed main wall 11, 13.

Preferably, the main thrust unit 50, 60 comprises a primary pinion-rack assembly 510, 610 adapted to directly act on the secondary wall 12, 14.

The primary pinion-rack assembly 510, 610 comprises a primary rack 511, 611 meshing with a primary pinion 512, 612.

The main thrust unit 50, 60 further comprises a secondary pinion-rack assembly 520, 620 adapted to act on the primary pinion-rack assembly 510, 610.

The secondary pinion-rack assembly 520, 620 comprises a secondary rack 521, 621 meshing with a secondary pinion 522, 622.

The main thrust unit 50, 60 further comprises pneumatic means 530, 630 adapted to act on the secondary pinion-rack assembly 520, 620. In other words, the pneumatic means 530, 630 is adapted to determine a linear movement of the secondary rack 521, 621 that, in turn, is adapted to determine a corresponding rotary movement of the secondary pinion 522, 622.

The secondary pinion 522, 622 and primary pinion 521, 621 are fitted on the same rod.

The rotary motion of the secondary pinion 522, 622 gives rise to a corresponding rotary motion of the primary pinion 512, 612 causing displacement of the primary rack 511, 611.

Preferably, the pneumatic means 530, 630 comprises a pneumatic cylinder.

In particular, with reference to FIG. 3, the first main thrust unit 50 acts on the first secondary wall 12 in such a manner as to move it towards the first main wall 11. In other words, the first main thrust unit 50 gives rise to mutual approaching of the first main 11 and secondary 12 walls.

According to the invention, a user control unit 80 (to be described in detail in the following) controls the action of the pneumatic means 530 causing displacement of the first secondary wall 12 and consequent constraint of the piece of meat 20 in channel 10 along the constraint direction d1.

In particular, with reference to FIG. 4, the second main thrust unit 60 acts on the second secondary wall 14. In other words, the second main thrust unit 60 gives rise to mutual approaching of the second main 13 and secondary 14 walls.

According to the invention, a user control unit 80 (to be described in detail in the following) controls the action of the pneumatic means 630 giving rise to displacement of the second secondary wall 14 and consequent constraint of the piece of meat 20 in channel 10, along the constraint direction d2.

Figure 6:
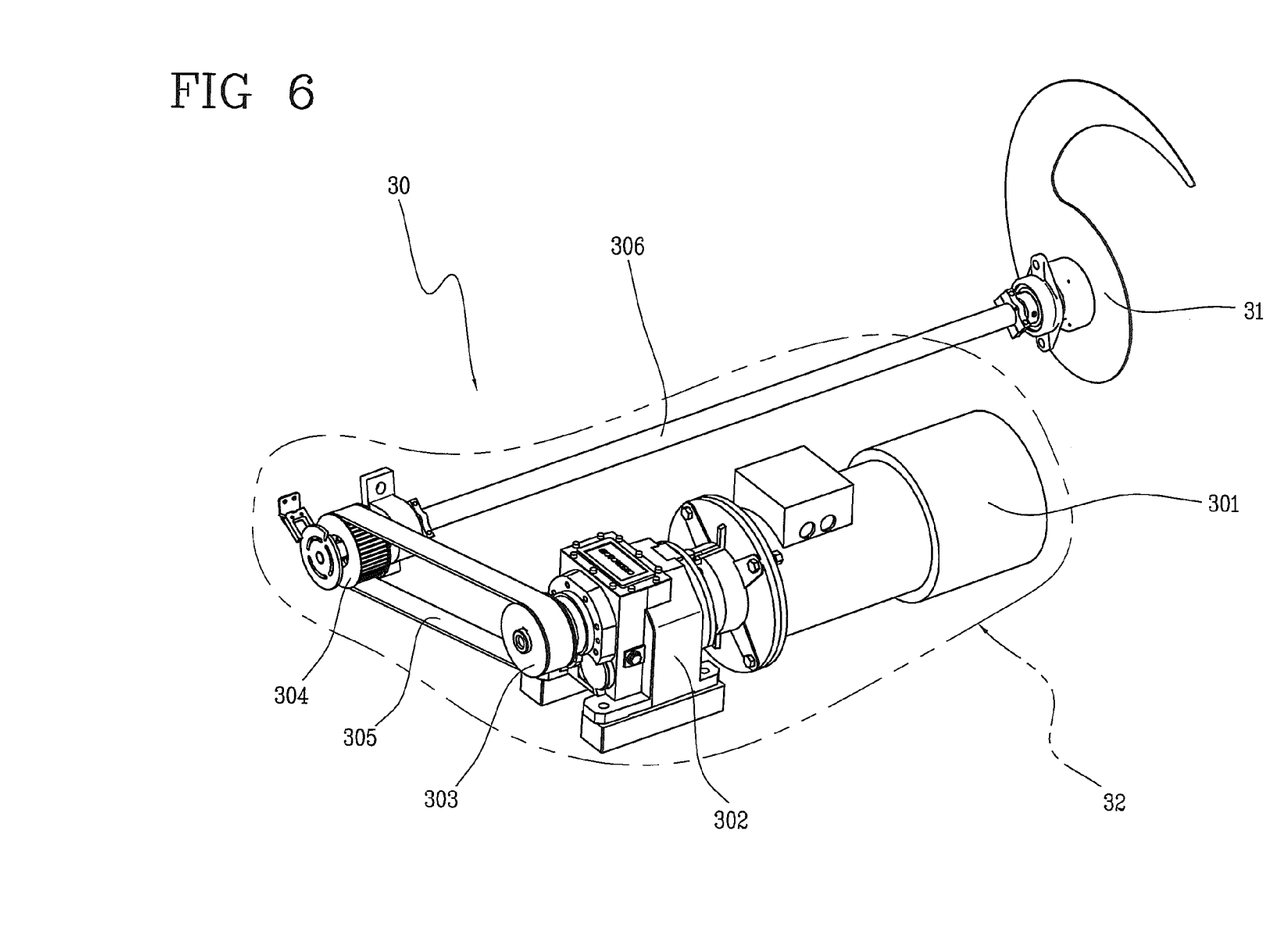
FIG. 6 is a perspective view of cutting means of the meat-cutting machine of the invention.

Referring particularly to FIG. 6, the meat-cutting machine comprises cutting means 30 adapted to cut the piece of meat 20 coming out of the outlet opening 15. According to the invention, the cutting means 30 comprises a blade 31.

Preferably, blade 31 is mounted to the meat-cutting machine in such a manner that its sharp edge is oriented perpendicular to the piece of meat 20 coming out of the outlet opening 15.

The cutting means 30 further comprises a cutting unit 32 adapted to drive blade 31 in such a manner that it cuts the piece of meat 20 coming out of the outlet opening 15.

The cutting unit 32 comprises an electric motor 301 acting on a first drive shaft (not shown in the figure) generating the rotary motion of the shaft.

Preferably, the electric motor 301 is associated with a reduction motor 302.

The cutting unit 32 further comprises a pair of pulleys 303, 304 synchronised in their rotary motion by a belt 305.

The cutting unit 32 comprises a second drive shaft 306 adapted to receive the rotary motion from pulley 304 and transmit it to blade 31.

According to the invention, a user control unit 80 (to be described in detail in the following) controls operation of the electric motor 301 according to a plurality of operating parameters.

Figure 5:
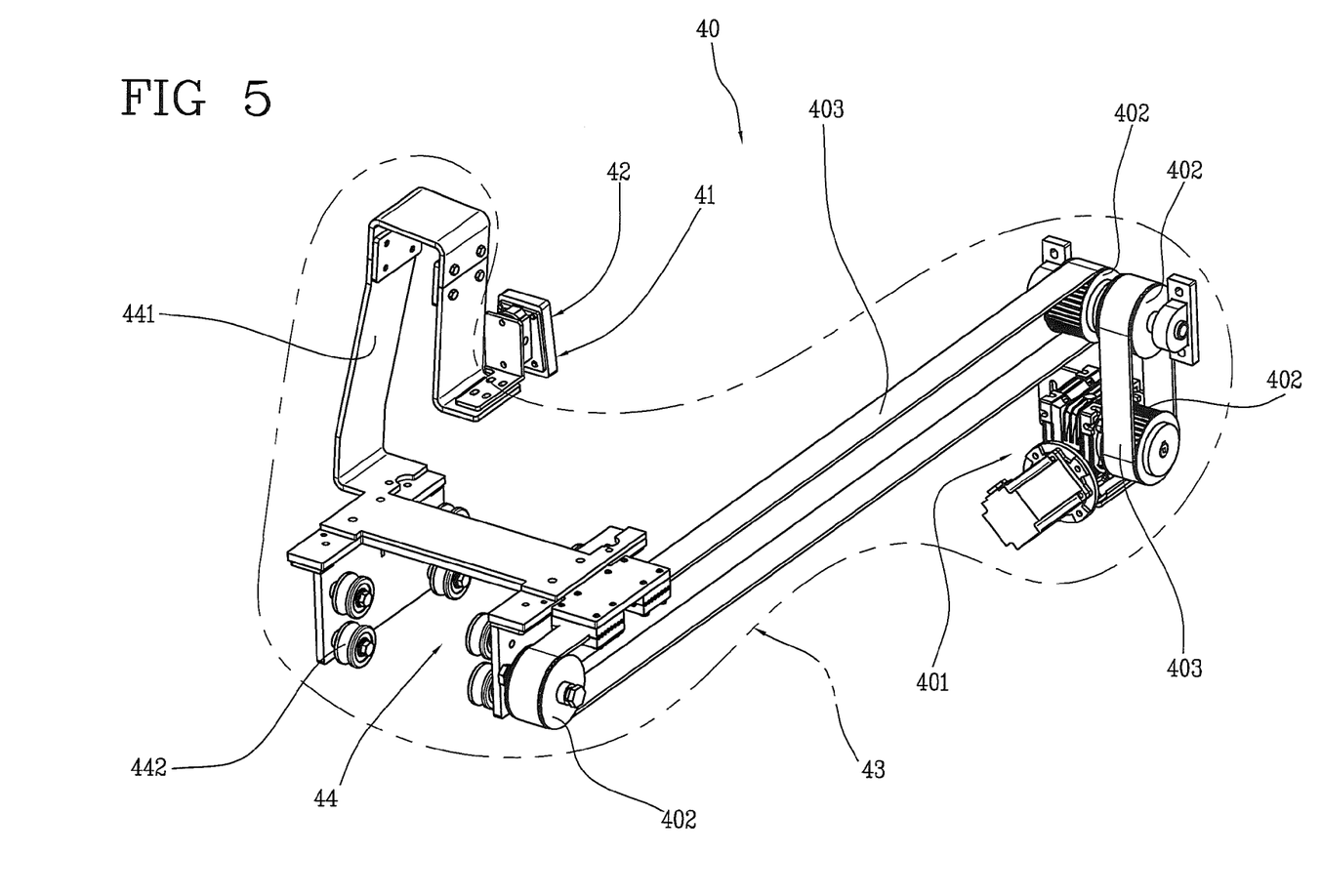
FIG. 5 is a perspective view of a secondary thrust unit of the meat-cutting machine of the invention.

According to the invention, referring particularly to FIG. 5, the meat-cutting machine comprises thrust means 40 adapted to exert a thrust on the piece of meat 20 in the feeding direction d.

Figure 7:
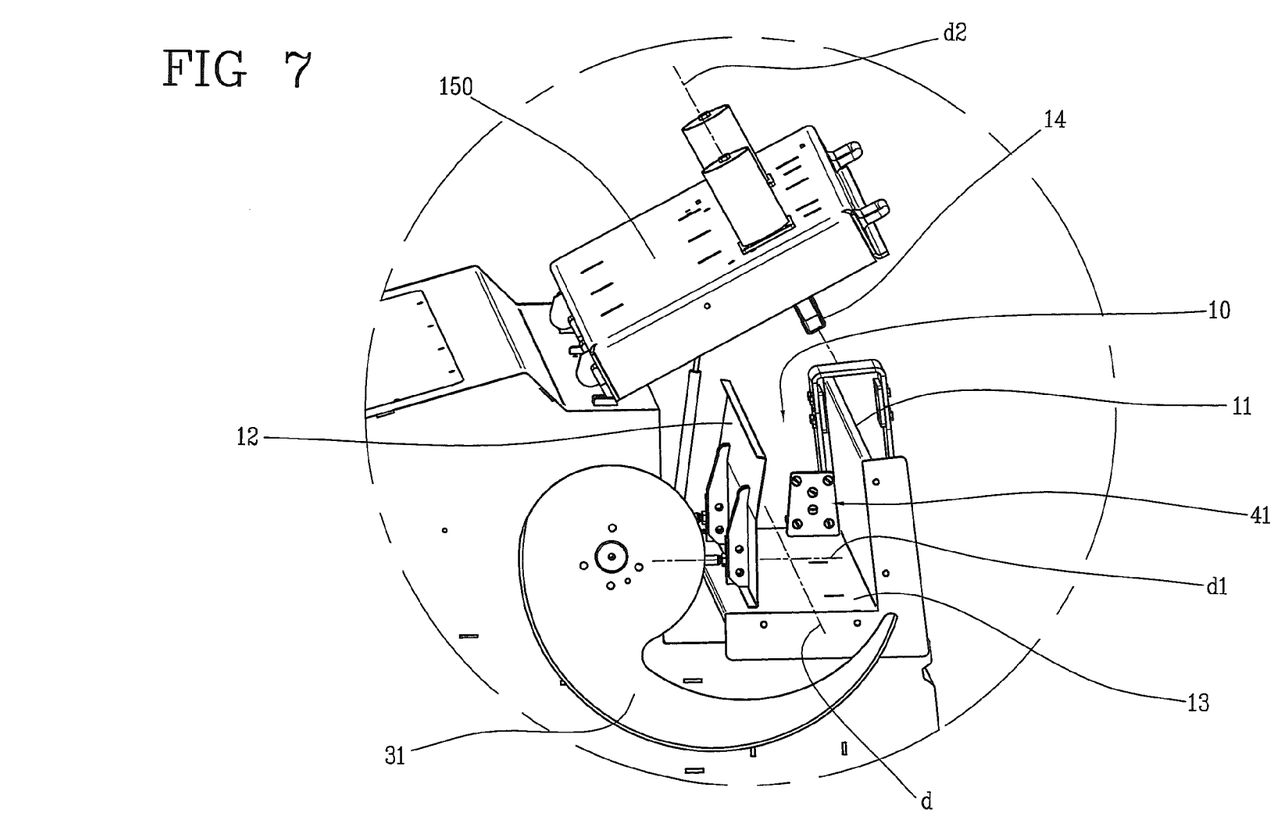
FIG. 7 is a detailed view of some components of the meat-cutting machine of the invention.

Preferably, the thrust means 40 comprises a planar abutment (FIGS. 2, 5 and 7) adapted to push the piece of meat 20 towards the outlet opening 15.

The thrust means 40 further comprises a secondary thrust means 43 connected to the planar abutment 41.

The secondary thrust unit 43 is adapted to cause displacement of the planar abutment 41 in channel 10, along the feeding direction d of the piece of meat 10. Preferably, the planar abutment 41 comprises a contact surface 42 for contact with the piece of meat 20.

According to the invention, this contact is without grip. In other words, the planar abutment 41 rests on the piece of meat 20 without the piece of meat being stuck.

Differently said, the contact surface 42 is configured to exert a bearing and thrust action on the piece of meat 20.

Referring particularly to FIG. 5, the secondary thrust unit 43 comprises a pusher carriage 44 suitable to act on the planar abutment 41.

The pusher carriage 44 comprises a plurality of wheels 442 adapted to enable the carriage to run along rails parallel to the sliding direction d of the piece of meat 20.

Preferably, these rails are made in the meat-cutting machine in a region under channel 10.

Pairs of wheels 442 constrain sliding of the pusher carriage 44 through rolling thereof over and below the rails.

Sliding of the pusher carriage 44 gives rise to a corresponding movement of the planar abutment 41 along the feeding direction d.

In particular, the pusher carriage 44 comprises a folded-down wing 441 such shaped that it transmits the advancing movement of the pusher carriage 44 to the planar abutment 41.

Preferably, the folded-down wing 441 is mounted on the side of channel 10 defined by the first main wall 11, so that it does not at all interfere with the movement of the first secondary wall 12.

The secondary thrust unit 43 further comprises an electric motor 401, preferably associated with a reduction motor 402 and connected by a pulley 402 and belt 403 system to wheels 442, so as to cause sliding of the pusher carriage 44.

Figure 8:
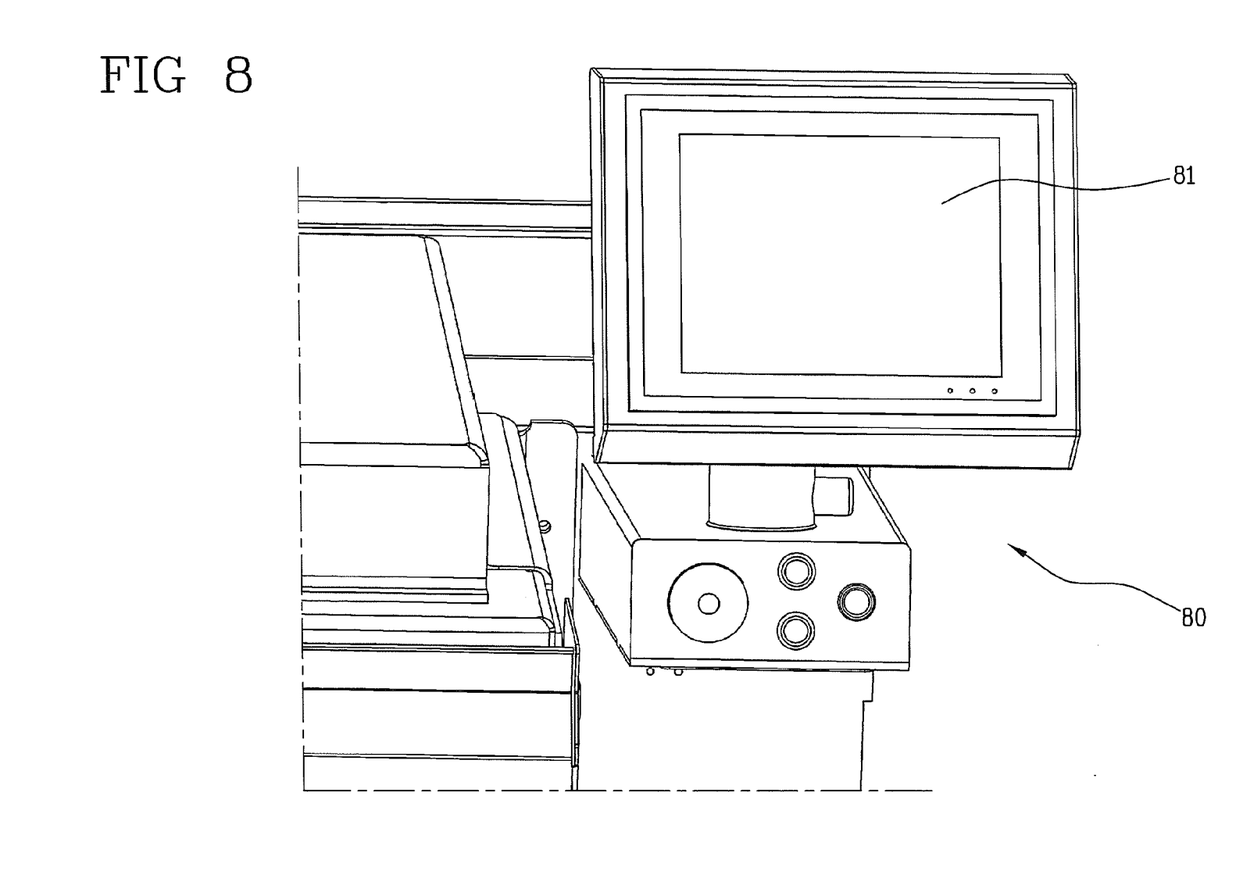
FIG. 8 shows a user control unit of the invention.

The meat-cutting machine is provided with an interface 81 for inputting all cutting parameters that are deemed to be optimal by the user.

In other words, in the meat-cutting machine of the invention, the user control unit 80 is configured to time an action of one or more of said cutting means 30 and thrust means 40, as a function of cutting parameters that the user deems to be optimal, which can be inputted through the interface 81.

The interface can be a conventional user interface comprising a display and a series of commands susceptible of selection.

In addition or alternatively, the interface can be used for data communication with an additional automated system from which the value of the desired thickness is automatically taken.

In a variant of the invention (FIG. 10), the meat-cutting machine comprises retaining means 71, 72, 73, 74 provided in the vicinity of the outlet opening 15.

Figure 10:
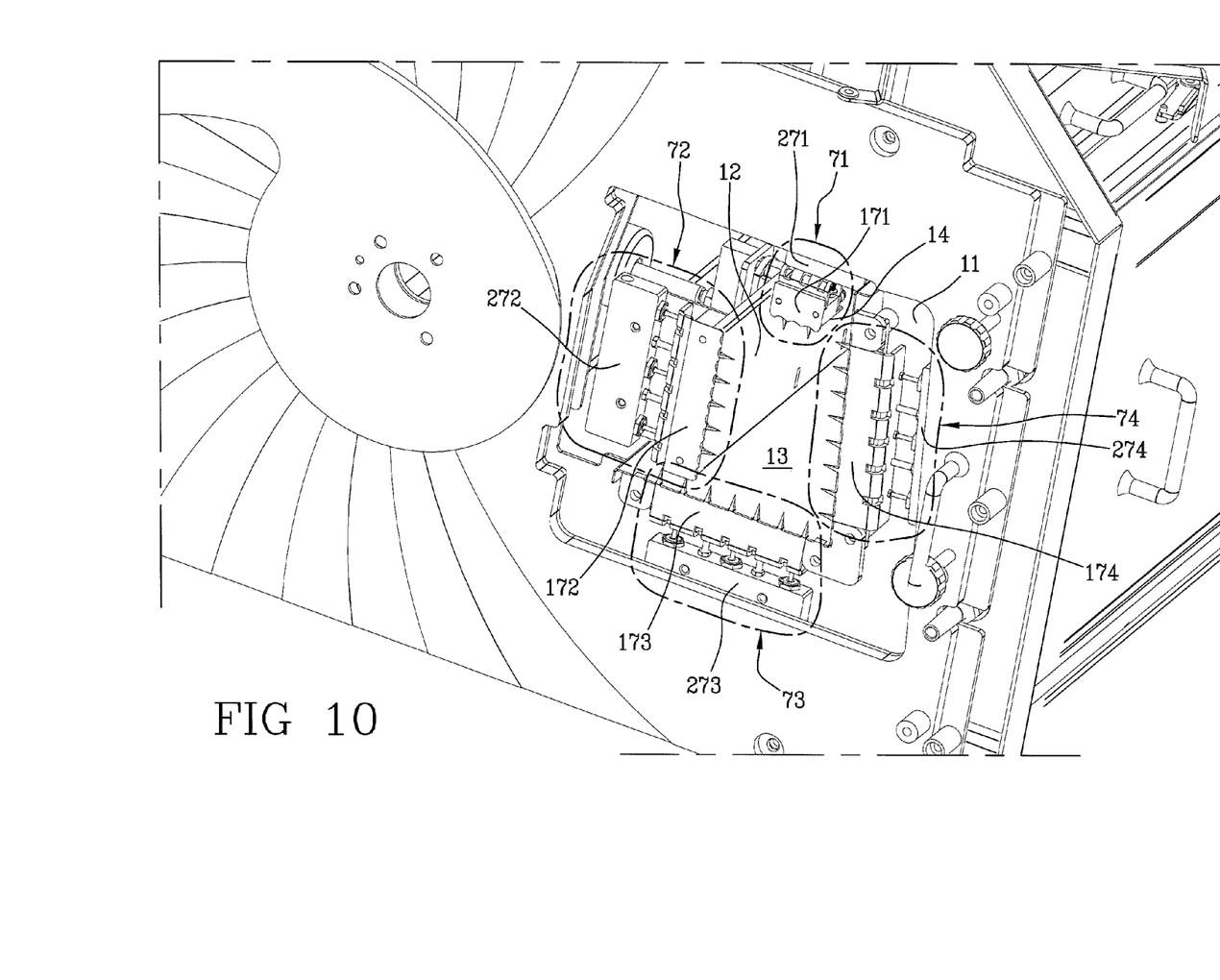
FIG. 10 is a detailed view of some components of the meat-cutting machine according to a variant of the invention.

In particular, these retaining means 71, 72, 73, 74 are mounted on the machine structure 1 in such a manner that they can act in the vicinity of the outlet opening 15.

The retaining means 71, 72, 73, 74 are configured to retain the piece of meat 20 coming out of channel 10 for the time required for the cutting operation.

In other words, the retaining means 71, 72, 73, 74 can be removably associated with the piece of meat 20, in the vicinity of the outlet opening 15 as a function of predetermined cutting parameters Pt.

In particular, the retaining means will act on the piece of meat 20 close to the final part of the piece of meat to be cut so as to enable safe retention of the last portion of the piece of meat that is more subjected to movements and consequently to inexact cuts.

Preferably, the retaining means 71, 72, 73, 74 comprise fixed components 271, 272, 273, 274 and movable components 171, 172, 173, 174, the latter being configured to block and tighten the piece of meat 20 to be cut.

According to the invention, the fixed components 271, 272, 273, 274 are integral with the respective walls 14, 12, 13, 11.

The fixed components 271, 272, 273, 274 are made in the form of small blocks containing pneumatic cylinders; these cylinders are configured to determine movement of the respective fixed components 171, 172, 173, 174.

According to the invention, the movable components 171, 172, 173, 174 are provided with clamps configured to be stuck into the piece of meat 20 to be cut.

According to the invention, based on the thickness that the cut meat slice must have, the interface 81 is configured to receive a value of the cutting parameter Pt from a user, so that the control unit 80 sets the necessary instructions for carrying out the cut.

The technical effect achieved is an accurate cut of the piece of meat 20 coming out of the outlet opening 15 reproducing in a precise manner the settings defined by the user.

A further technical effect is minimisation of the amount of meat rejected from the piece of meat 20, as it is not appropriate for packaging being of sizes not in accordance with the necessary requirements.

In alternative forms of the invention one or more of the described retaining means may be provided.

Figure 9:
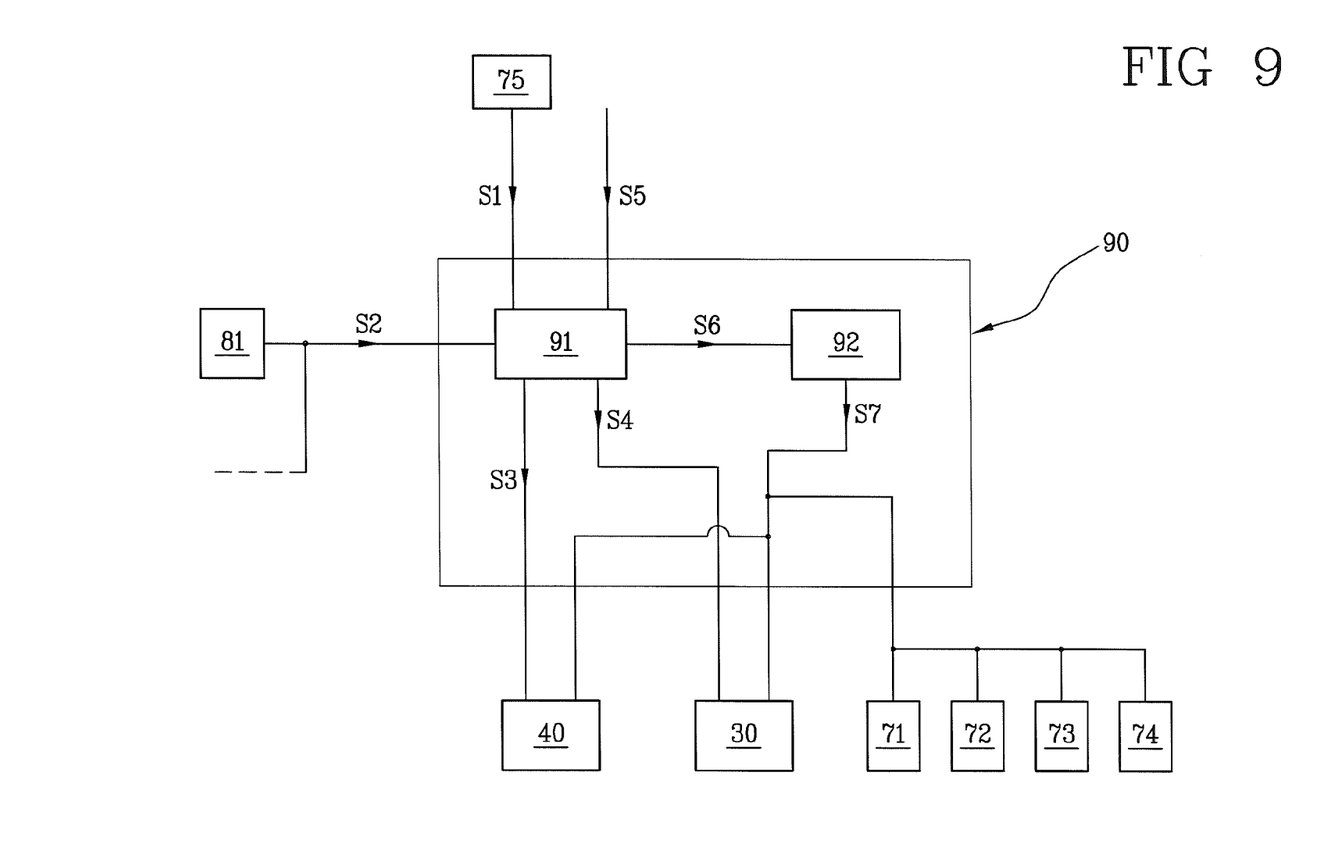
FIG. 9 is a block diagram of a user control unit of the invention.

According to the invention, the control unit 80 is configured to process the parameters Pt inputted by the user and drive a corresponding action of the meat-cutting machine.

In particular, the meat-cutting machine comprises detecting means 75 detecting the position of the piece of meat 20 in channel 10.

The control unit 80 comprises a processing unit 90 configured to process the data detected by the detecting means 75 so as to synchronise the cutting means 30 with the thrust means 40.

In other words, the user control unit 80 is configured to synchronise the cutting means with the thrust means 40.

More specifically, the user control unit 80 is configured to time the action of the cutting means as a function of a movement of the thrust means 40.

Timing can take place by means of suitable kinematic mechanisms and substantially mechanical components. Alternatively or in addition, the user control unit 80 is provided with a specific control.

In particular, the processing unit 90 comprises a first calculation module 91 configured to receive a first signal S1 from the detecting means 75, which first signal is representative of the sizes of the piece of meat 20 introduced into the channel.

The first calculation module 91 is further configured to receive a second signal from the interface 81 or from a preset configuration C1, which second signal is representative of the thickness of a slice of meat to be cut starting from the piece of meat 20.

The first calculation module 91 is further configured to emit a third signal S3 for the cutting means 30 and a fourth signal S4 for the thrust means 40, obtained as a function of the input signals S1 and S2.

In other words, depending on the length of the piece of meat 20 introduced into the channel and the thickness/number of slices required by the user (cutting parameter Pt), the calculation module 90 actuates a motor, in particular a brushless motor, determining advancing of the thrust means 40 and the cut by the cutting means 30 synchronised with the advancing of the thrust means 40.

In addition, the processing unit 90 is configured to process the data detected by the detecting means 75 so as to synchronise the cutting means 30 with the thrust means 40 and with the retaining means 71, 72, 73, 74.

More specifically, the user control unit 80 is further configured to time the action of the retaining means 71, 72, 73, 74 and of the cutting means as a function of a movement of the thrust means 40.

In particular, the user control unit 80 is configured to time the action of the movable components 171, 172, 173, 174 with the cutting means 30 as a function of a movement of the thrust means 40.

To this aim, in particular, the first calculation module 91 is further configured:
- to receive a fifth signal S5 representative of a reached limit position P of the piece of meat 20, beyond which a cut cannot be carried out without retention by the retaining means 71, 72, 73, 74 through the respective movable components 171, 172, 173, 174;
- to transmit to a second calculation module 92, a signal S6 representative of the reached limit position P.

The processing unit 90 therefore comprises the second calculation module 92 configured to receive signal S6 from the first calculation module 91, and to actuate the retaining means 71, 72, 73, 74, in particular the movable components 171, 172, 173, 174, in synchronism with the cutting means 30 and the thrust means 40.

In other words, the calculation module 92 is configured:
- to actuate the retaining means 71, 72, 73, 74, in particular the movable components 171, 172, 173, 174, in such a manner that they may retain the piece of meat 20, after the thrust means 40 has caused a portion of the piece of meat 20 to come out of the outlet opening 15;
- to actuate the cutting means 30 so that said means cuts the aforesaid emerged and retained portion;
- to actuate the retaining means 71, 72, 73, 74, in particular the movable components 171, 172, 173, 174, in such a manner that said means release the piece of meat 20 after the cutting means 30 has cut the aforesaid portion;
- if the piece of meat 20 is not finished, to actuate the thrust means 40 so that said means makes a new portion of the piece of meat 20 come out of the outlet opening 15.

In the specification, when reference is made to "modules" the term is understood as indifferently indicating hardware or routine software cards configured for operation in a programmed, centralised or distributed, microprocessor device, locally and/or remotely.

As already said, timing between the thrust means, cutting means and retaining means can be also obtained by suitable kinematic mechanisms and substantially mechanical components.

The invention claimed is:

1. A meat-cutting machine, in particular for cutting meat with bone, comprising:
   a channel (10) adapted to contain a piece of meat (20) to be cut suitable to move forward in an advancing or feeding direction (d), the channel (10) being defined by faced walls (11, 13 and 12, 14), the walls being mutually movable in transverse directions (d1, d2) relative to the feeding direction (d) of the piece of meat (20);
   said faced walls (11, 13 and 12, 14) forming:
   a guide for moving the piece of meat (20) forward in the channel (10);
   an outlet opening (15) for exit of the piece of meat (20) from the channel (10);
   cutting device (30) adapted to cut the piece of meat (20) coming out of the outlet opening (15);
   thrust device (40) adapted to exert a thrust on the piece of meat (20) in the feeding direction (d);
   a user control unit (80) configured to synchronise said cutting device (30) with said thrust device (40).

2. A meat-cutting machine as claimed in claim 1, wherein said user control unit (80) is configured to time the action of the cutting device (30) as a function of a movement of said thrust device (40).

3. A meat-cutting machine as claimed in claim 1, wherein the faced walls (11, 13 and 12, 14) comprises first walls (11, 13) and second walls (12, 14) that are opposite and susceptible of mutual translation in respective directions (d1, d2) perpendicular to the feeding direction (d) of the piece of meat (20).

4. A meat-cutting machine as claimed in claim 1, comprising a main thrust unit (50, 60)
   associated with said secondary wall (12, 14) and
   adapted to act on said secondary wall (12, 14) for determining movement of same relative to said fixed main wall (11, 13).

5. A meat-cutting machine as claimed in claim 1, wherein the thrust means device (40) comprises:
   a planar abutment (41) adapted to push the piece of meat (20) towards said outlet opening (15);
   a secondary thrust unit (43) connected to the planar abutment (41) and adapted to determine movement of the latter in the channel (10), along the feeding direction (d).

6. A meat-cutting machine as claimed in claim 5, wherein said planar abutment (41) comprises a contact surface (42) configured for a bearing and thrust action against the piece of meat (20).

7. A meat-cutting machine as claimed in claim 1, wherein said cutting device (30) comprises:
   a blade (31);
   a cutting unit (32) adapted to actuate said blade (31) for cutting said piece of meat (20) coming out of said outlet opening (15).

8. A meat-cutting machine as claimed in claim 1, comprising retaining devices (71, 72, 73, 74) provided in the vicinity of said outlet opening (15), said retaining devices (71, 72, 73, 74) comprising fixed components (271, 272, 273, 274) integral with said respective walls (14, 12, 13, 11), and movable components (171, 172, 173, 174) configured to block and tighten the piece of meat (20) to be cut.

9. A meat-cutting machine as claimed in claim 8, wherein said movable components (171, 172, 173, 174) are provided with clamps configured to be stuck into said piece of meat (20) to be cut.

10. A meat-cutting machine as claimed in claim 8, wherein said user control unit (80) is configured to time the action of said retaining devices (71, 72, 73, 74) and said cutting device (30), as a function of a movement of said thrust device (40).

11. A meat-cutting machine as claimed in claim 10, wherein said control unit (80) comprises a processing unit (90) comprising a first calculation module (91) configured:
   to receive a first signal (S1) from detecting device (75), which first signal is representative of the sizes of the piece of meat (20) introduced into the channel (10);
   to receive a second signal (S2) from an interface (81) or from a preset configuration (C1), which second signal is representative of a thickness (Pt) of the slice of meat to be cut starting from the piece of meat (20);
   to emit a third signal (S3) for said cutting device (30) and a fourth signal (S4) for said thrust device (40), as a function of said first and second input signals (S1 and S2).

12. A meat-cutting machine as claimed in claim 11, wherein said first calculation module (91) is further configured:
   to receive a fifth signal (S5) representative of a limit position (P) reached by the piece of meat (20), beyond which a cut cannot be carried out without retention by said retaining devices (71, 72, 73, 74);
   to transmit to a second calculation module (92), a signal (S6) representative of the reached limit position (P).

13. A meat-cutting machine as claimed in claim 12, wherein said processing unit (90) comprises a second calculation module (92) configured:

- to actuate said retaining devices (71, 72, 73, 74), in such a manner that they may retain the piece of meat (20), after said thrust device (40) has caused a portion of the piece of meat (20) to come out of said outlet opening (15);
- to actuate the cutting device (30) so that said device cuts the aforesaid emerged and retained portion;
- to actuate the retaining devices (71, 72, 73, 74) in such a manner that said devices release said piece of meat (20) after said cutting device (30) has cut said portion;
- if the piece of meat (20) is not finished, to actuate said thrust device (40) so that said device makes a new portion of the piece of meat (20) to come out of the outlet opening (15).

14. A meat-cutting machine as claimed in claim 1, comprising detecting device (75) to detect the presence of said piece of meat (20) in said channel (10).

* * * * *